US007003638B2

(12) United States Patent
Brant et al.

(10) Patent No.: US 7,003,638 B2
(45) Date of Patent: Feb. 21, 2006

(54) MEMORY BUS INTERFACE FOR USE IN A PERIPHERAL DEVICE

(75) Inventors: Paul M. Brant, Pelham, NY (US); John E. Stone, III, Dripping Springs, TX (US)

(73) Assignee: Standard Microsystems Corporation, Hauppauge, NY (US)

( * ) Notice: Subject to any disclaimer, the term of this patent is extended or adjusted under 35 U.S.C. 154(b) by 394 days.

(21) Appl. No.: 10/316,363

(22) Filed: Dec. 11, 2002

(65) Prior Publication Data

US 2004/0117565 A1 Jun. 17, 2004

(51) Int. Cl.
*G06F 12/00* (2006.01)

(52) U.S. Cl. ............... 711/154; 711/105; 711/170; 345/531

(58) Field of Classification Search ............... 711/154, 711/170, 105; 345/531
See application file for complete search history.

(56) References Cited

U.S. PATENT DOCUMENTS

| 5,218,684 A | * | 6/1993 | Hayes et al. ............... 711/219 |
| 5,309,568 A | | 5/1994 | Ghosh et al. .................. 710/3 |
| 5,724,604 A | | 3/1998 | Moyer ........................ 712/43 |
| 5,818,844 A | * | 10/1998 | Singh et al. ................ 370/463 |
| 6,012,128 A | * | 1/2000 | Birns et al. ................. 711/163 |
| 6,222,564 B1 | | 4/2001 | Sturges ....................... 345/531 |
| 6,327,640 B1 | | 12/2001 | Gittinger et al. ............ 711/105 |
| 6,401,154 B1 | * | 6/2002 | Chiu et al. .................. 710/260 |
| 6,401,156 B1 | * | 6/2002 | Mergard et al. ............ 710/266 |
| 6,631,484 B1 | * | 10/2003 | Born .......................... 710/305 |

OTHER PUBLICATIONS

Advanced Micro Devices, "Am186ES and Am188ES User's Manual", pp 1-192, 1997.*
IEEE, "IEEE 100-the authoritative dictionary of IEEE standards terms, 7th Ed.", definition, "peripheral", Dec. 2000.*

* cited by examiner

*Primary Examiner*—Stephen C. Elmore
(74) *Attorney, Agent, or Firm*—Meyertons Hood Kivlin Kowert & Goetzel, P.C.; Jeffrey C. Hood (57) ABSTRACT

A peripheral device may include an interface configured to interface to a memory bus and a functional unit coupled to the interface and configured to perform a peripheral device function on data accessed by the interface. The interface may be configured to perform a data access in response to memory control, address, and data signals on the memory bus. The functional unit may be configured to perform various peripheral device functions such as data communication functions, video functions, printing functions, mass storage functions, and human interface controller functions.

53 Claims, 5 Drawing Sheets

MEMORY BUS INTERFACE FOR USE IN A PERIPHERAL DEVICE

FIELD OF THE INVENTION

This invention relates to computer systems and, more particularly, to transferring data to a peripheral device within a computer system.

DESCRIPTION OF THE RELATED ART

Figure 1:
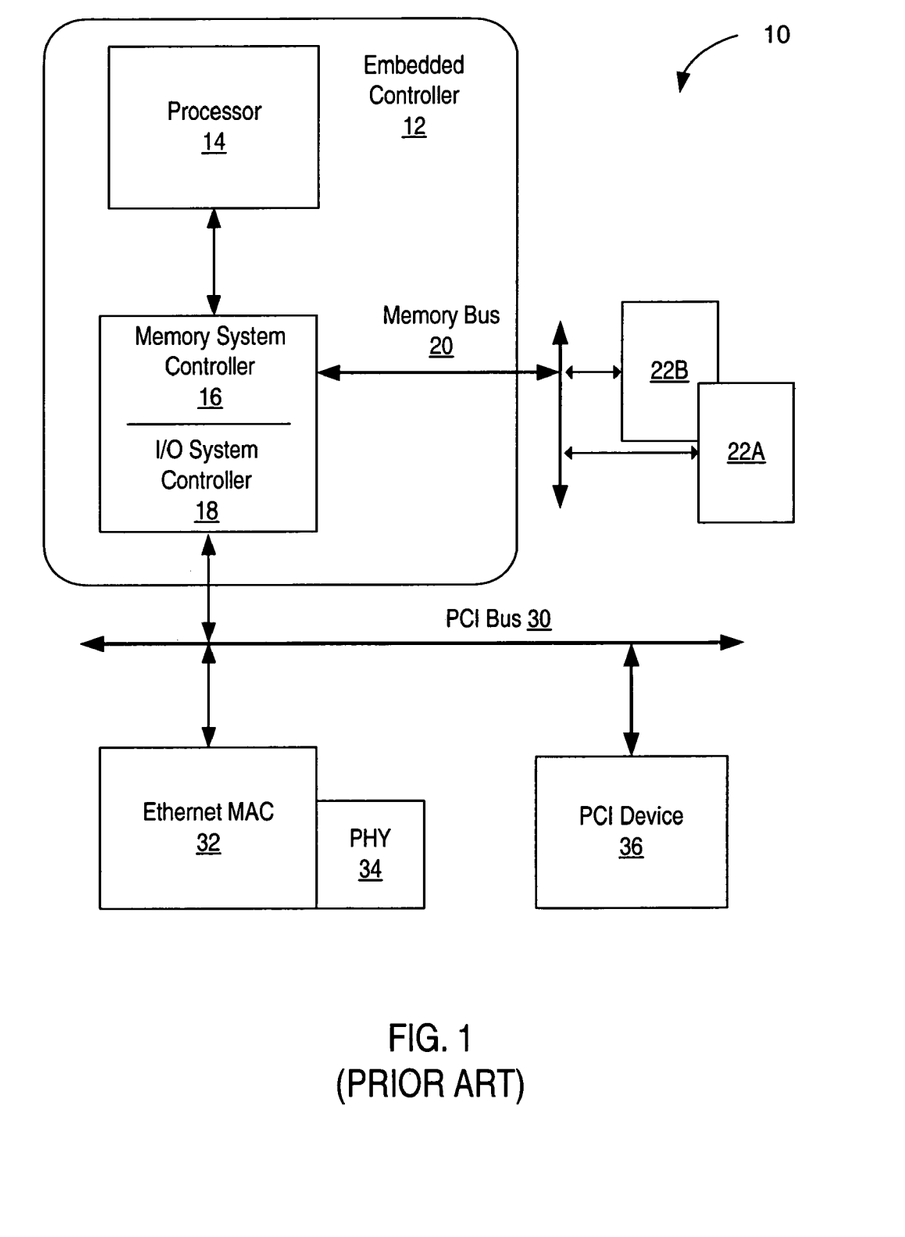
FIG. 1 shows an exemplary computer system according to Prior Art.

FIG. 1 illustrates a typical configuration of a computer system 10 that includes an embedded controller 12, several memory modules 22A–22B, a memory bus 20, a PCI (Peripheral Component Interconnect) bus 30, an Ethernet MAC (Media Access Control) 32 and associated PHY (PHYsical Layer) device 34, and another PCI device 36. The embedded controller 12 includes a processor 14 and a bus bridge that includes a memory system controller 16 and an I/O system controller 18. The memory controller 16 allows the processor to communicate with memory modules 22A–22B via transfers over memory bus 20. I/O system controller 18 allows the processor 14 to communicate with the Ethernet MAC 34 and PCI device 36 via the PCI bus 30.

When the data is being transferred to or from computer system 100 via the Ethernet MAC 32, the I/O system controller 18 may be required to bridge data between the PCI bus 30 and the memory bus 20. This mechanism for communicating may experience latency and arbitration problems due to the presence of other devices 36 on the PCI bus 30. Generally, as contention for the PCI bus 30 increases, the performance of the PCI bus may decrease. Accordingly, it is desirable to be able to provide improved communication with peripheral devices such as Ethernet MAC 32.

SUMMARY

Various embodiments of systems and methods for interfacing a peripheral device to a memory bus are disclosed. In one embodiment, an interface for use with a peripheral device may include a memory bus interface and a device interface. The memory bus interface is configured to receive memory control, address, and data signals on a memory bus. The device interface is configured to communicate data to a functional unit in the peripheral device in response to the memory bus interface receiving the memory control, address, and data signals. For example, in response to the memory bus interface receiving memory control signals indicating a memory write command and address signals indicating an address of a memory mapped structure within the functional unit, the device interface may write data received by the memory bus interface from the memory bus to the memory mapped structure in the functional unit.

In some embodiments, the memory bus interface may be configured to memory control, address, and data signals generated according to an SDRAM (Synchronous Dynamic Random Access Memory) protocol. Other memory protocols (e.g., DDR SDRAM, DDR II SDRAM, DRAM, etc.) may be supported in other embodiments. The memory bus interface may be configured to send and receive burst transfers of data on the memory bus in many embodiments.

In one embodiment, the memory bus interface may be configured to access a memory mapped control and configuration register in response to an address corresponding to the memory mapped control and configuration register being indicated by address signals on the memory bus. Operation of the memory bus interface in response to memory control, address, and data signals may depend on the current setting of the memory mapped control and configuration register. For example, such a memory mapped control and configuration register may control memory bus parameters such as a timing mode, default burst length, signal latencies (e.g., RAS to CAS), and so on.

In some embodiments, a peripheral device may include an interface configured to interface to a memory bus and a functional unit coupled to the interface and configured to perform a peripheral device function on data accessed by the interface. The interface may be configured to perform a data access in response to memory control, address, and data signals on the memory bus. The functional unit may be configured to perform various peripheral device functions such as data communication functions, video functions, printing functions, mass storage, and human interface controller functions. In one embodiment, the functional unit may be configured to perform Ethernet MAC (Media Access Control) functions.

In some embodiments, the interface may be configured to participate in burst transfers of data on the memory bus. For example, in response to receiving memory control signals initiating a burst write command on the memory bus, the interface may store a burst of data received in successive burst transfers on the memory bus to a memory mapped structure included in the functional unit. The interface may be configured to buffer at least a portion of the burst of data before storing that portion of the burst of data to the memory mapped structure.

In one embodiment, the functional unit may include a memory mapped data transmit FIFO (First In, First Out) and a memory mapped data receive FIFO. The interface may be configured to output data from the memory mapped data receive FIFO to the memory bus in response to receiving memory control signals indicating a memory read command and address signals indicating an address mapped to the memory mapped data receive FIFO. Similarly, the interface may be configured to write data from the memory bus to the memory mapped data transmit FIFO in response to receiving memory control signals indicating a memory read command and address signals indicating an address mapped to the memory mapped data transmit FIFO.

In another embodiment, a peripheral device may include an interface configured to interface to a memory bus and a functional unit. The interface is configured to receive memory control, address, and data signals on the memory bus. The interface may be configured to provide data to the functional unit in response to receiving the memory control, address, and data signals on the memory bus. The functional unit may be configured to functions of the peripheral device. The peripheral device is operable to couple to the memory bus via the interface and is accessible as a memory device when coupled to the memory bus.

In one embodiment, a computer system may include a memory controller, a memory bus coupled to the memory controller, memory coupled to the memory bus, and a peripheral device coupled to the memory bus. The peripheral device is configured to respond to memory control signals and address signals generated by the memory controller on the memory bus. In some embodiments, such a peripheral device may be configured to operate as a bus master on the memory bus.

One embodiment of a method may involve: generating memory control signals and address signals on a memory bus; a peripheral device coupled to the memory bus receiving the memory control signals and address signals; the peripheral device performing a data access indicated by the memory control signals and address signals; and the peripheral device performing a peripheral device function on data accessed by said performing. In one embodiment, the method may also involve the peripheral device receiving successive cycles of data on the memory bus in a burst transfer.

BRIEF DESCRIPTION OF THE DRAWINGS

A better understanding of the present invention can be obtained when the following detailed description is considered in conjunction with the following drawings, in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include" and derivations thereof mean "including, but not limited to." The term "connected" means "directly or indirectly connected," and the term "coupled" means "directly or indirectly coupled."

DETAILED DESCRIPTION OF THE EMBODIMENTS

Figure 2:
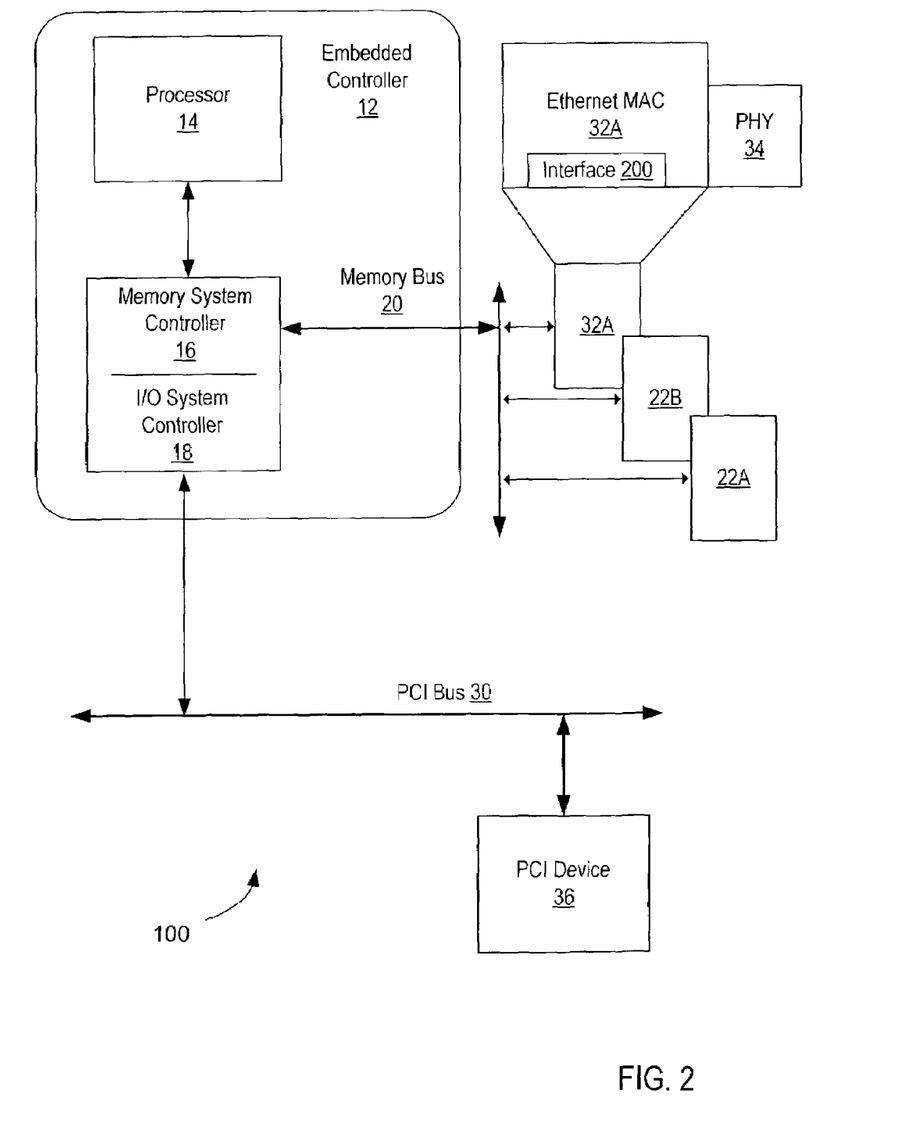
FIG. 2 is a block diagram of a computer system that includes a peripheral device that is configured to interface to a memory bus, according to one embodiment.

FIG. 2 illustrates a block diagram of a computer system 100 that includes a peripheral device 32A configured to interface to a memory bus 20, according to one embodiment. In FIG. 2, an embedded controller 12 is coupled to a memory bus 20 and a PCI bus 30. Embedded controller 12 includes a processor 14, a memory system controller 16, and an I/O system controller 18. Memory bus 20 is coupled to two memory modules 22A and 22B and a peripheral device 32A. PCI bus 30 is coupled to a PCI device 36. PCI bus 36 is illustrated as an exemplary peripheral or I/O bus. Other peripheral bus technologies such as ISA (Industry Standard Architecture) and USB (Universal Serial Bus) may be used in other embodiments.

In some embodiments, the memory system controller 16 may be configured to transmit standard SDRAM (Synchronous Dynamic Random Access Memory) control and address signals to SDRAM memory modules 22A and 22B via memory bus 20. In one such embodiment, memory modules 22A and 22B may be DDR (Double Data Rate) SDRAM memory modules and the memory system controller 16 may be configured to transmit DDR SDRAM control and address signals. In other embodiments, the memory system controller 18 and memory modules 22A and 22B may be configured according to other DRAM standards. In one embodiment, the memory bus 20 may be a standard 32-bit SDRAM bus that conveys standard chip selects to enable a targeted device and standard SDRAM control signals, such as RAS, CAS, WE, CKE, CLK, DQMx, BA[2:0], CS[2:0], as well as standard 11-bit Row/Column Address signals. As used herein, "memory control signals" are signals generated by a memory system controller that initiate an access to a memory module. Such signals may also be used to initiate an access to a peripheral device, as described below.

Peripheral device 32A, which is an Ethernet MAC associated with a PHY (Physical Layer) device 34 in the illustrated embodiment, is configured to couple directly to the memory bus 20 via an interface 200. The interface 200 may be integrated within the Ethernet MAC 32A or attached as an add-on device external to the Ethernet MAC 32A. Note that in other embodiments, a peripheral device 32 that includes an interface 200 may be any of various types of peripheral devices, including but not limited to: data communication devices, video devices, mass storage devices, printing devices, and human interface controllers.

The interface 200 may access configuration and control registers, data receive FIFOs (First In, First Out queues), data transmit FIFOs, linked lists, descriptors and data array structures and/or other memory mapped structures within interface 200 and/or peripheral device 32A in response to memory control and address signals on the memory bus 20. The memory mapped structures within interface 200 and/or peripheral device 32A may be allocated either static or dynamic memory addresses. The same memory control signals (e.g., RAS, CAS, CS, etc.) used to access memory modules 22A and 22B may also be used to access peripheral device 32A. For example, in response to a memory control signals indicating initiation of a read command by memory system controller 16, data may be output onto the memory bus 20 from one of the memory modules 22A and 22B or from peripheral device 32A, depending on which address is indicated by address signals on memory bus 20. Similarly, in response to a memory write command initiated by memory system controller 16 targeting an address mapped to peripheral device 32A, interface 200 may write data conveyed on the memory bus 20 to corresponding locations within interface 200 and/or peripheral device 32A. In some embodiments, no additional signal lines beyond those required to access memory modules 22A and 22B may be needed to access peripheral device 32A via memory bus 20.

The interface 200 may support one or more memory timing modes (e.g., such as the 133 MHz SDRAM timing mode) to allow the system memory controller 16 to access the peripheral device 32A as another memory mapped memory module such as memory modules 22A and 22B. A port size of interface 200 to memory bus 20 may be sized dependent on the size of the Ethernet MAC 32A's bus width.

In the embodiment of FIG. 2, transfers between embedded controller 12 a data communications transport stack data area in memory modules 22A and 22B and Ethernet MAC 32A may take place over the memory bus 20. Since the Ethernet MAC 32A is no longer coupled to the PCI bus 30, as was shown in FIG. 1, the intervention of I/O system controller 18 is no longer required to move data between embedded controller 12 and/or a data communications transport stack data area in memory modules 22A and 22B and Ethernet MAC 32A. Accordingly, these transfers may experience reduced latency and arbitration issues relative to systems in which an Ethernet MAC is coupled to the PCI bus.

The peripheral device 32A may have several modes of operation in some embodiments. In one mode, the peripheral device 32A may simply act as a memory-mapped device by responding to read and write commands initiated by memory system controller 16 that target addresses mapped to peripheral device 32A. For example, in one embodiment, the peripheral device 32A may respond to memory read and write commands initiated by memory system controller 16 exactly like a 32-, 16-, or 8-bit SDRAM device. In another mode, the peripheral device 32A may act as a slave device on the memory bus 20 (e.g., using a DMA (Direct Memory Access) controller included in embedded controller 12). In yet another mode, the peripheral device 32A may behave as a bus master on the memory bus 20. For example, some systems may support multiple memory bus "masters" by allowing one master to "hold off" another via a "Hold," "Hold Acknowledge" handshake protocol. In such an embodiment, the peripheral device 32A may be configured to generate a "Hold" cycle of command and/or address signals on the memory bus. In response, the embedded controller 12 and/or its internal memory system controller 16 may respond with a "Hold Acknowledge" cycle. Upon completion of the handshake, the peripheral device 32A may use an internal memory controller (not shown) to move data to the appropriate memory location(s) without the intervention of processor 14 or the memory system controller 16. In some embodiments, peripheral device 32A may also support a master configuration in which the peripheral device 32A performs autonomous scatter/gather bus master operations. Note that in some embodiments, peripheral device 32A may support only a single mode of operation. In other embodiments, peripheral device 32A may support several user-selectable modes of operation.

Interface 200 within peripheral device 32A may include system configuration and control registers that store parameters indicating certain memory module parameters such as default burst length, control signal pulse widths, timing mode, etc. These system configuration and control register may be memory mapped to allow the embedded controller 12 to tune performance of accesses to the peripheral device 32A via memory bus 20. The settings of these configuration and control register may control the operation of interface 200 in response to signals on memory bus 20. For example, in embodiments supporting multiple burst lengths, the default burst length setting for transfers to peripheral device 32A on memory bus 20 may be set to a greater burst length (e.g., full page bursts, if supported) by updating a value in a system configuration and control register included in interface 200. Other settings, such as RAS to CAS latency and CAS to data available access latencies may be selected (e.g., depending on which memory modules 22A and 22B are used within the system 100 and what speed those memory modules are able to achieve) by writing to the appropriate memory mapped control and configuration register. Note that some timing and control functions, supported by memory modules 22A and 22B, for functions and settings such as refresh, numbers of memory banks, etc. that are memory-module-specific may not be supported by interface 200. Additional control and configuration settings which are not implemented in memory modules 22A and 22B may be included within interface 200. For example, interface 200 may include registers that support optional interrupt and/or polled status operation of transfers to peripheral device 32A. Such registers may be used to provide packet and/or frame flow control between a peripheral device such as an Ethernet MAC and embedded controller 12. The interface 200 included in peripheral device 32A may be configured to participate in burst transfers on memory bus 20 according to a particular memory standard supported by the system memory controller 16. Such burst transfers may have various lengths (e.g., 1, 2, 4, 8, 256). In some embodiments, interface 200 may be configured to support a default burst setting (e.g., as indicated in a system configuration and control register in interface 200). Some embodiments may support a limited number of different burst lengths (e.g., 1 and 4). The interface 200 may also support various burst address ordering patterns supported by memory modules 22A and 22B in some embodiments. Similarly, the interface may support various wrap types (e.g., sequential or interleaved).

Figure 3:
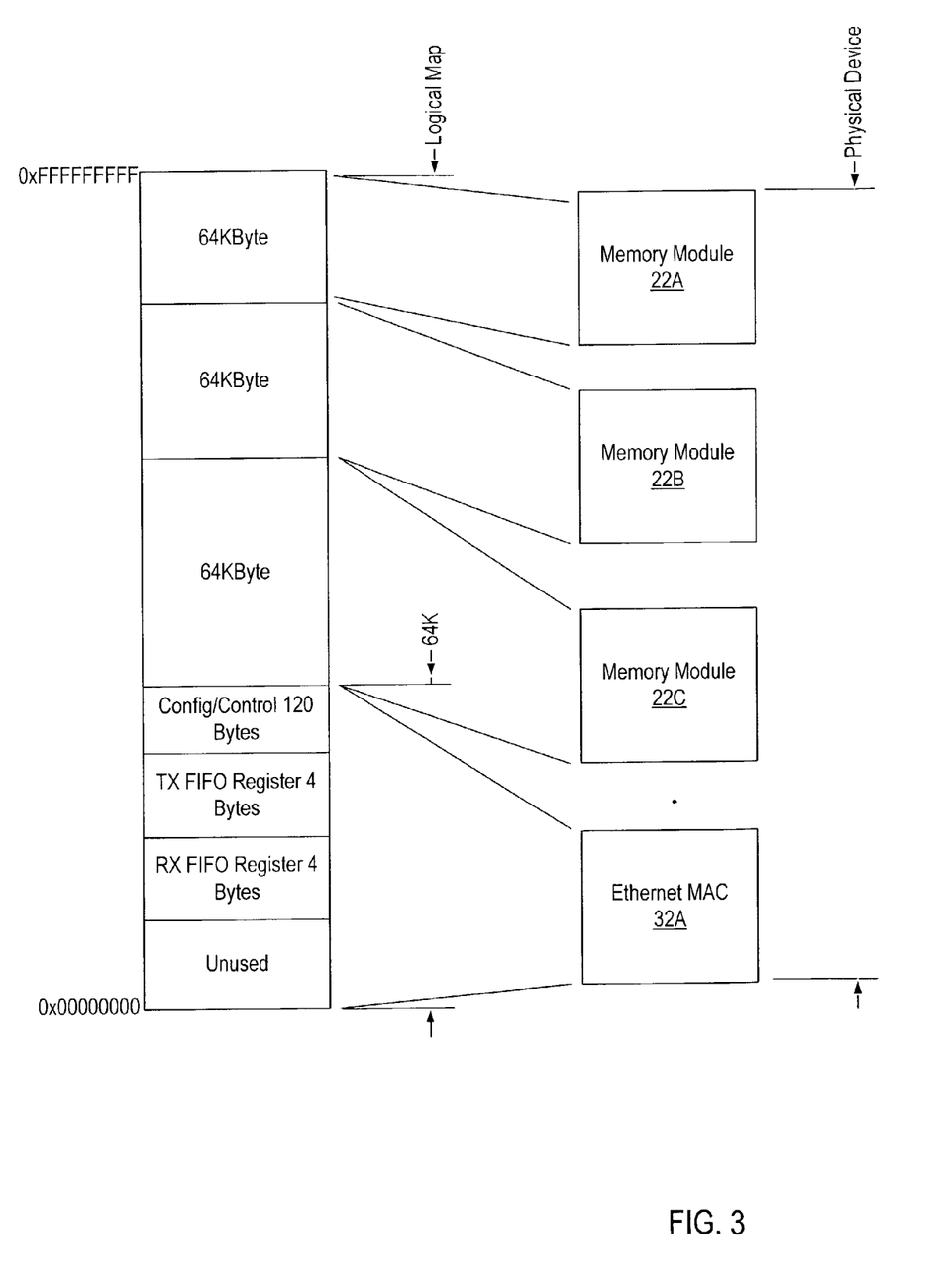
FIG. 3 shows an exemplary memory mapping that may be used to access a peripheral device via a memory bus, according to one embodiment.

FIG. 3 illustrates how the peripheral device 32A that includes an interface 200 may be memory mapped to an address range within system memory address space. In the illustrated embodiment, three memory modules 22A–22C are each logically mapped to a distinct 64 Kbyte address range. Another distinct 64 Kbyte address range is mapped to the Ethernet MAC 32A. Note that in other embodiments, different sizes of address ranges may be mapped to each physical device, and that different numbers and types of physical devices may be included in the mapping. For example, several peripheral devices, which include interfaces 200 that allow those peripheral devices to access memory bus 20, may be included in the mapping.

In this example, 120 Bytes of the 64 Kbyte address range mapped to the Ethernet MAC 32A are mapped to configuration and control registers. As mentioned above, the values of these registers may control the behavior and performance of the Ethernet MAC 32A on memory bus 20. Four bytes of the 64 Kbyte address range are mapped to a transmit FIFO register and four bytes are mapped to a receive FIFO. These FIFOs may be respectively used to store data to be transmitted by Ethernet MAC 32A via PHY 34 or to store data received by Ethernet MAC 32A via PHY 34.

Note that in the illustrated embodiment, a portion of the address range mapped to the Ethernet MAC 32A is unused. In some embodiments, the interface 200 may be configured to respond to read commands on the memory bus 20 targeting an unused address location within the address range mapped to the Ethernet MAC 32A. For example, in one embodiment, the interface 200 may be configured to return a particular value, such as FFFF FFFF, in response to a read command targeting an unused memory location, assuming the interface receives the appropriate value of the CS# signal. The interface 200 may be configured to not respond to write commands targeting an unused memory location within the address range mapped to Ethernet MAC 32A.

Figure 4:
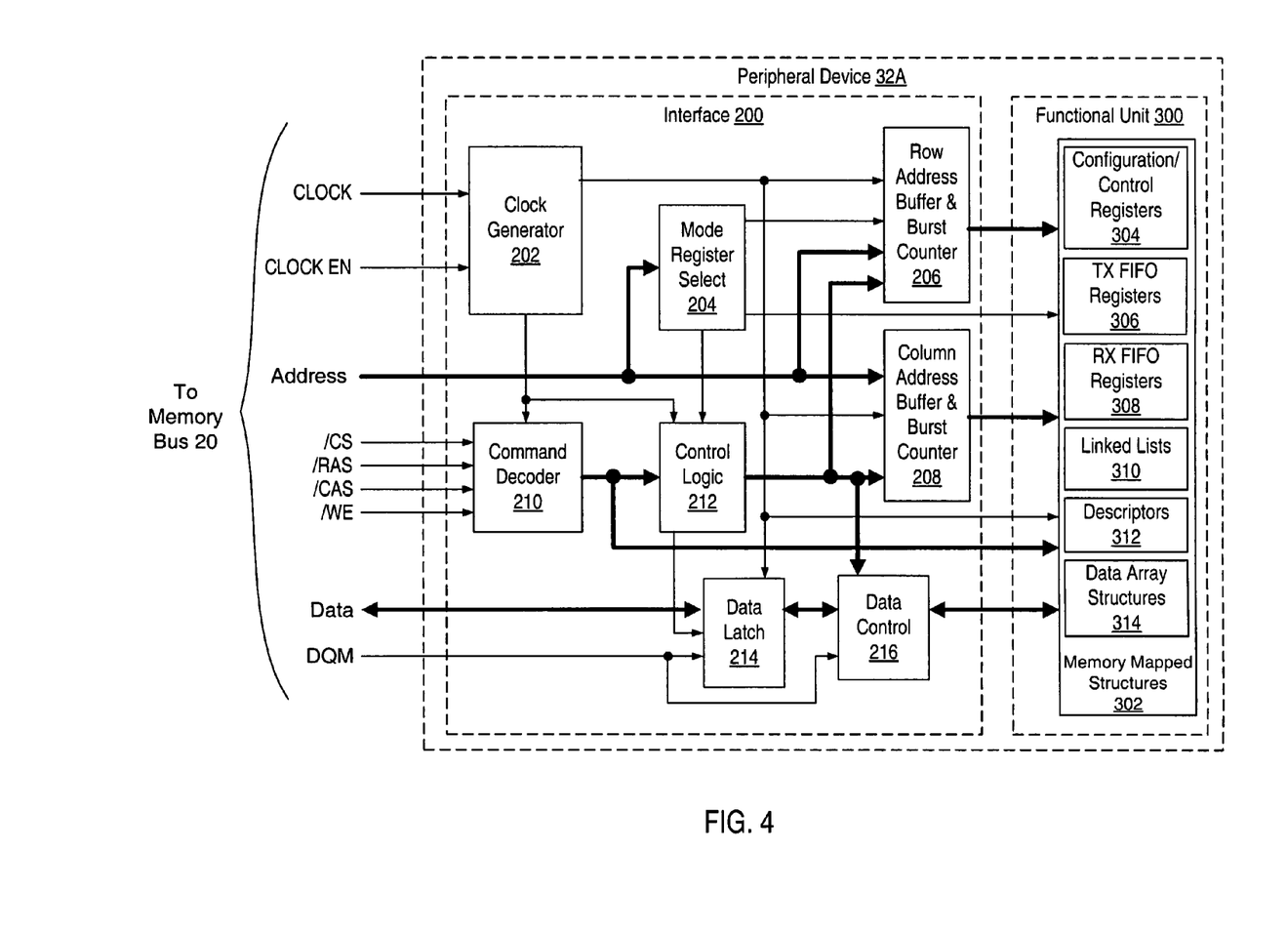
FIG. 4 is a block diagram of a memory bus interface for use in a peripheral device, according to one embodiment.

FIG. 4 illustrates one embodiment of a peripheral device 32A. In this embodiment, peripheral device includes an interface 200, which is configured to respond to memory commands on a memory bus as a memory module, and a functional unit 300. Functional unit 300 may include logic (not shown) to perform various functions of the peripheral device (e.g., to perform Ethernet MAC functions if the peripheral device is an Ethernet MAC). Depending on the type of peripheral device 32A, functional unit 300 may perform data communication, video, printing, and/or human interface functions. Functional unit 300 may also include certain memory mapped structures (e.g., transmit and receive FIFOs if the peripheral device is an Ethernet MAC) that are accessible via interface 200.

Other memory mapped structures 302 (e.g., certain control and configuration registers controlling timing and burst lengths for transactions on memory bus 20) may be included in interface 200 in some embodiments. For example, in one embodiment, interface 200 may implement these registers in a serial EEPROM (Electrically Erasable Programmable Read Only Memory) configured to store memory mapped timing, configuration and other application specific parameters. These parameters may be updated within the EEPROM device in response to commands targeting those addresses on the memory bus 20.

In the illustrated embodiment, interface 200 is configured to implement an SDRAM protocol. Interface 200 receives memory command signals /CS, /RAS, /CAS, and /WE from memory bus 20. These memory command signals are the same signals used to access memory modules via memory bus 20. Interface 200 also receives address, data, DQM, clock, and clock enable signals from memory bus 20. Generally, interface 200 may convert the memory command, address, and data signals received via memory bus 20 into appropriate signals that access data stored in memory mapped structures 302. In some embodiments, operation of interface 200 may be pipelined. Interface 200 may provide read and write buffering for data received from or transferred to memory bus 20. The portions of interface 200 that receive memory control, address, and data signals from memory bus 20 provide an interface to memory bus 20, while the portions of interface 200 that provide control, access, and data signals to memory mapped structures 302 provide an interface to functional unit 300 within peripheral device 32A.

In this embodiment, a clock generator 202 receives a clock and a clock enable signals and generates appropriate timing signals to control operation of a row address buffer and burst counter 206, a column address buffer and burst counter 208, a command decoder 210, and a data latch 214. Operation of clock generator 202 may be modified in response to updates to memory mapped control and configuration registers specifying timing parameters for interface 200. For example, clock generator 202 may be configured to generate timing signals in more than one SDRAM timing mode. The timing mode may be selected by updating one of the memory mapped control and configuration registers.

Command decoder 210 may receive memory command signals used to access a memory device (e.g., an SDRAM memory module) from memory bus 20 and, dependent on timing signals from clock generator 202, determine the type of memory access (e.g., read, write, burst read, burst write, etc.) currently being requested. The type of memory access being requested by also depend on the current value of certain memory mapped control and configuration registers (e.g., a register value indicating the current default burst length). The command decoder 210 may output signals identifying the type of requested access to control logic 212 and to the memory mapped structures 302.

Mode register select 204 may receive address signals from memory bus 20 and generate responsive mode signals to control logic 212 and memory mapped structures 302. Control logic 212 may receive signals indicating a type of requested access from command decoder 210, timing signals from clock generator 202, and mode signals from mode register select 204 and responsively control data latch 214, row address buffer and burst counter 206, column address buffer and burst counter 208, and data control unit 216.

Memory mapped structures 302 may respond to the command signals generated by command decoder 210 by performing the specified type of access to an address indicated by address signals generated by row address buffer and burst counter 206 and column address buffer and burst counter 208, dependent on timing signals generated by clock generator 202 and mode signals generated by mode register select 204. For a read access, the memory mapped structures 302 may output the specified data to data control 216 for temporary storage in data latch 214 before being output to memory bus 20. For a write access, the memory mapped structures 302 may write data provided by data control unit 216 from data latch 214 into the specified address.

Figure 5:
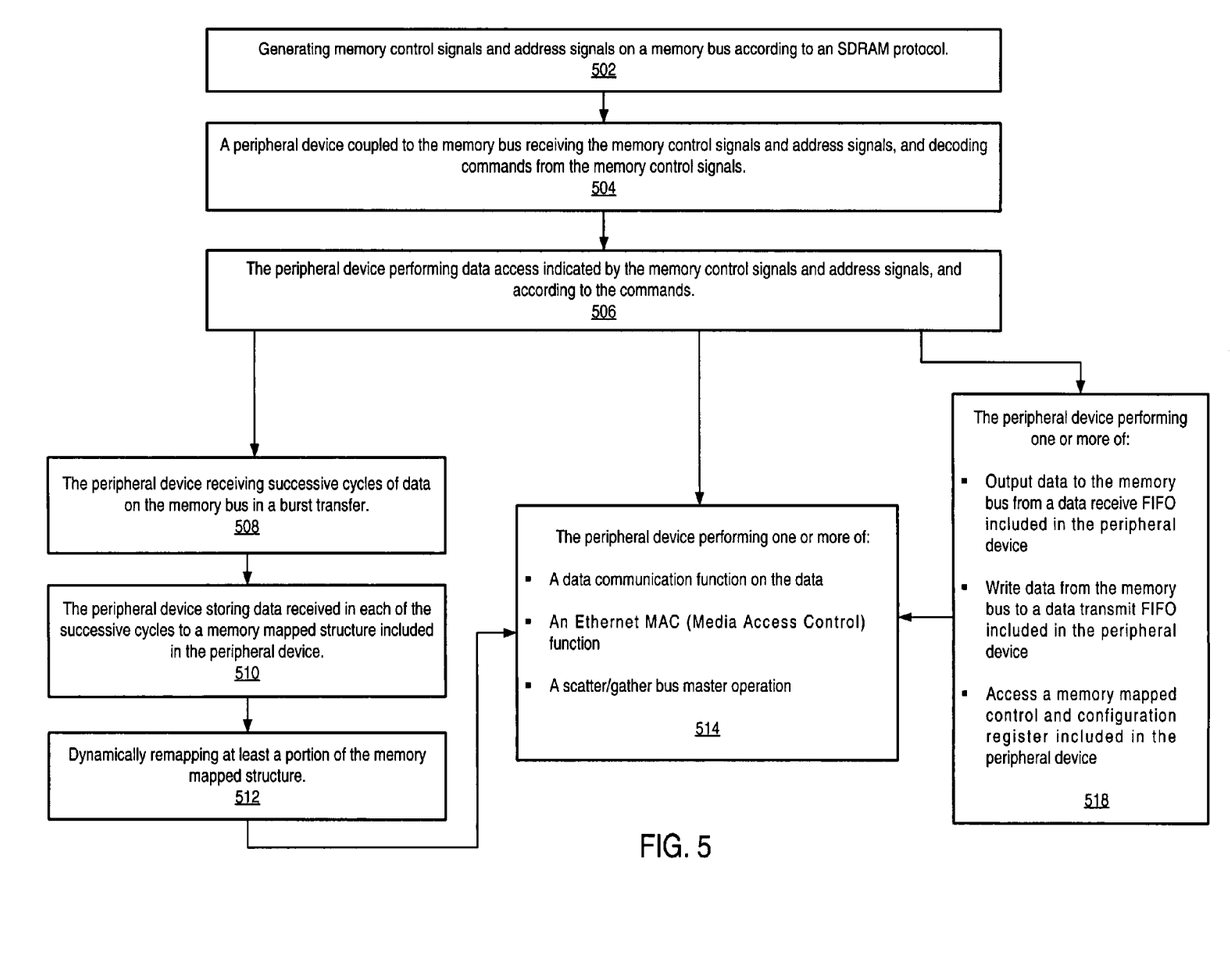
FIG. 5 shows a flowchart describing peripheral device access via a memory bus according to one embodiment of the present invention.

FIG. 5 is a flowchart describing peripheral device access via a memory bus according to one embodiment of the present invention. Memory control signals and address signals may be generated on a memory bus according to an SDRAM (Synchronous Dynamic Random Access Memory) protocol (502), and a peripheral device coupled to the memory bus may receive the memory control signals and address signals, and may decode commands from the memory control signals (504). The peripheral device may perform a data access indicated by the memory control signals and address signals, and according to the commands (506). The peripheral device may receive successive cycles of data on the memory bus in a burst transfer (508), and may store data received in each of the successive cycles to a memory mapped structure included in the peripheral device in response to receiving memory control signals initiating a burst write command on the memory bus (510). At least a portion of the memory mapped structure may be remapped (512). The peripheral device may also output data to the memory bus from a data receive FIFO included in the peripheral device, in response to receiving memory control signals indicating a memory read command, and address signals indicating an address mapped to the data receive FIFO (518). The peripheral device may write data from the memory bus to a data transmit FIFO included in the peripheral device, in response to receiving on the memory bus memory control signals indicating a memory read command, and address signals indicating an address mapped to the data transmit FIFO (518). Furthermore, the peripheral device may access a memory mapped control and configuration register included in the peripheral device, in response to an address corresponding to the memory mapped control and configuration register being indicated by address signals on the memory bus (518). The peripheral device may subsequently perform a designated function corresponding to the peripheral device, such as performing a data communication function on the data, and/or performing an Ethernet MAC (Media Access Control) function, and/or performing a scatter/gather bus master operation (514).

Numerous variations and modifications will become apparent to those skilled in the art once the above disclosure is fully appreciated. It is intended that the following claims be interpreted to embrace all such variations and modifications.

What is claimed is:

1. An interface for use with a peripheral device, the interface comprising:
   a memory bus interface configured to receive memory control, address, and data signals on a memory bus, wherein the memory bus interface is operable to decode commands from the memory control signals;
   a device interface coupled to the memory bus interface, wherein the device interface is configured to communicate data to a functional unit in the peripheral device and/or to the memory bus in response to the memory bus interface receiving memory control, address, and data signals on the memory bus, and according to the commands decoded from the memory control signals.

2. The interface of claim 1, wherein the memory bus interface is configured to receive memory control, address, and data signals generated according to an SDRAM (Synchronous Dynamic Random Access Memory) protocol.

3. The interface of claim 1, wherein the memory bus interface is configured to access a memory mapped control and configuration register in response to an address corresponding to the memory mapped control and configuration register being indicated by address signals on the memory bus.

4. The interface of claim 3, wherein operation of the memory bus interface in response to memory control, address, and data signals is dependent on a current setting of the memory mapped control and configuration register.

5. The interface of claim 1, wherein the memory bus interface is configured to send and receive burst transfers of data on the memory bus.

6. A peripheral device, comprising:
an interface configured to interface to a memory bus, and further configured to decode commands from memory control signals on the memory bus, wherein the interface is operable to perform a data access in response to memory control, address, and data signals on the memory bus and according to the commands decoded from the memory control signals; and
a functional unit coupled to the interface and configured to perform one or more functions associated with the peripheral device, on the data accessed by the interface.

7. The peripheral device of claim 6, wherein the interface is configured to participate in burst transfers of data on the memory bus.

8. The peripheral device of claim 7, wherein the interface is configured to receive a burst of data in successive burst transfers on the memory bus and to store the burst of data to a memory mapped structure included in the functional unit, in response to receiving memory control signals initiating a burst write command on the memory bus.

9. The peripheral device of claim 8, wherein the interface is configured to buffer at least a portion of the burst of data before storing that portion of the burst of data to the memory mapped structure.

10. The peripheral device of claim 6, wherein the functional unit is configured to perform data communication functions.

11. The peripheral device of claim 6, wherein the functional unit is configured to perform Ethernet MAC (Media Access Control) functions.

12. The peripheral device of claim 11, wherein the functional unit includes a memory mapped data transmit FIFO (First In, First Out) and a memory mapped data receive FIFO;
wherein the interface is configured to output data from the memory mapped data receive FIFO to the memory bus in response to receiving on the memory bus memory control signals indicating a memory read command and address signals indicating an address mapped to the memory mapped data receive FIFO;
wherein the interface is configured to write data from the memory bus to the memory mapped data transmit FIFO in response to receiving on the memory bus memory control signals indicating a memory write command and address signals indicating an address mapped to the memory mapped data transmit FIFO.

13. The peripheral device of claim 6, wherein the interface is configured to support an SDRAM (Synchronous Dynamic Random Access Memory) protocol.

14. The peripheral device of claim 6, wherein the interface is configured to access a memory mapped control and configuration register in response to an address corresponding to the memory mapped control and configuration register being indicated by address signals on the memory bus.

15. The peripheral device of claim 14, wherein the interface is configured to perform data accesses in response to memory control, address, and data signals dependent on a current setting of the memory mapped control and configuration register.

16. A peripheral device, comprising:
an interface configured to interface to a memory bus, wherein the interface is configured to receive memory control, address, and data signals on the memory bus, and is operable to decode commands from the memory control signals received on the memory bus; and
a functional unit coupled to the interface, wherein the functional unit is configured to perform functions associated with the peripheral device;
wherein the interface is configured to provide data to the functional unit in response to receiving the memory control, address, and data signals on the memory bus, and according to the commands decoded from the memory control signals received on the memory bus;
wherein the peripheral device is operable to couple to the memory bus via the interface and to be accessed as a memory device.

17. A computer system, comprising:
a memory controller;
a memory bus coupled to the memory controller;
memory coupled to the memory bus;
a peripheral device coupled to the memory bus;
wherein the peripheral device is configured to respond to memory control signals and address signals generated by the memory controller on the memory bus, wherein the peripheral device is operable to decode commands from the memory control signals, and to respond to the memory control signals and address signals according to the commands.

18. The computer system of claim 17, wherein the peripheral device is configured to participate in burst transfers of data on the memory bus.

19. The computer system of claim 18, wherein in response to receiving memory control signals initiating a burst write command on the memory bus, the peripheral device is configured to receive a burst of data in successive burst transfers on the memory bus and to store the burst of data to a memory mapped structure included in the peripheral device.

20. The computer system of claim 17, wherein the peripheral device is configured to perform data communication functions.

21. The computer system of claim 17, wherein the peripheral device is configured to perform Ethernet MAC (Media Access Control) functions.

22. The computer system of claim 21, wherein the peripheral device includes a memory mapped data transmit FIFO (First In, First Out) and a memory mapped data receive FIFO;
wherein the peripheral device is configured to output data from the memory mapped data receive FIFO to the memory bus in response to receiving on the memory bus memory control signals indicating a memory read command and address signals indicating an address mapped to the memory mapped data receive FIFO;

wherein the peripheral device is configured to write data from the memory bus to the memory mapped data transmit FIFO in response to receiving on the memory bus memory control signals indicating a memory write command and address signals indicating an address mapped to the memory mapped data transmit FIFO.

23. The computer system of claim 17, wherein the peripheral device is configured to support an SDRAM (Synchronous Dynamic Random Access Memory) protocol.

24. The computer system of claim 17, wherein the peripheral device is configured to access a memory mapped control and configuration register included in the peripheral device in response to an address corresponding to the memory mapped control and configuration register being indicated by address signals on the memory bus.

25. The computer system of claim 24, wherein the peripheral device is configured to perform data accesses in response to memory control, address, and data signals dependent on a current setting of the memory mapped control and configuration register.

26. The computer system of claim 24, wherein the peripheral device is operable to function as a slave device on the memory bus.

27. The computer system of claim 24, wherein the peripheral device is operable to function as a master device on the memory bus.

28. The computer system of claim 27, wherein the peripheral device is configured to perform scatter/gather bus master operations.

29. A method, comprising:
generating memory control signals and address signals on a memory bus;
a peripheral device coupled to the memory bus receiving the memory control signals and address signals;
the peripheral device decoding commands from the memory control signals;
in response to said receiving, the peripheral device performing a data access indicated by the memory control signals and address signals, and according to the commands;
the peripheral device performing a function associated with the peripheral device on data accessed by said performing.

30. The method of claim 29, further comprising the peripheral device receiving successive cycles of data on the memory bus in a burst transfer.

31. The method of claim 30, further comprising the peripheral device storing data received in each of the successive cycles to a memory mapped structure included in the peripheral device in response to receiving memory control signals initiating a burst write command on the memory bus.

32. The method of claim 31, further comprising dynamically remapping at least a portion of the memory mapped structure.

33. The method of claim 29, wherein said performing a peripheral device function comprises the peripheral device performing a data communication function on the data.

34. The method of claim 29, wherein said performing a peripheral device function comprises the peripheral device performing an Ethernet MAC (Media Access Control) function.

35. The method of claim 29, further comprising the peripheral device outputting data from a data receive FIFO included in the peripheral device to the memory bus in response to receiving memory control signals indicating a memory read command and address signals indicating an address mapped to the data receive FIFO.

36. The method of claim 29, further comprising the peripheral device writing data from the memory bus to a data transmit FIFO included in the peripheral device in response to receiving on the memory bus memory control signals indicating a memory write command and address signals indicating an address mapped to the data transmit FIFO.

37. The method of claim 29, wherein said generating memory control signals and address signals comprises generating signals according to an SDRAM (Synchronous Dynamic Random Access Memory) protocol.

38. The method of claim 29, further comprising the peripheral device accessing a memory mapped control and configuration register included in the peripheral device in response to an address corresponding to the memory mapped control and configuration register being indicated by address signals on the memory bus.

39. The method of claim 38, wherein said performing a data access is dependent on a current setting of the memory mapped control and configuration register.

40. An interface for use with a peripheral device, the interface comprising:
a memory bus interface configured to receive memory control, address, and data signals on a memory bus, wherein the memory bus interface is operable to access a memory mapped control and configuration register in response to an address corresponding to the memory mapped control and configuration register being indicated by address signals on the memory bus; and
a device interface coupled to the memory bus interface, wherein the device interface is configured to communicate data to a functional unit in the peripheral device in response to the memory bus interface receiving memory control, address, and data signals on the memory bus.

41. The interface of claim 40, wherein operation of the memory bus interface in response to memory control, address, and data signals is dependent on a current setting of the memory mapped control and configuration register.

42. The interface of claim 40, wherein the memory bus interface is configured to receive memory control, address, and data signals generated according to an SDRAM (Synchronous Dynamic Random Access Memory) protocol.

43. The interface of claim 40, wherein the memory bus interface is operable to send and receive burst transfers of data on the memory bus.

44. A computer system, comprising:
a memory controller;
a memory bus coupled to the memory controller;
memory coupled to the memory bus; and
a peripheral device coupled to the memory bus;
wherein the peripheral device is configured to respond to memory control signals and address signals generated by the memory controller on the memory bus, and wherein the peripheral device is configured to participate in burst transfers of data on the memory bus; and
wherein in response to receiving memory control signals initiating a burst write command on the memory bus, the peripheral device is configured to receive a burst of data in successive burst transfers on the memory bus and to store the burst of data to a memory mapped structure included in the peripheral device.

45. The computer system of claim 44, wherein the peripheral device is configured to perform data communication functions.

46. The computer system of claim 44, wherein the peripheral device is configured to perform Ethernet MAC (Media Access Control) functions.

47. The computer system of claim 46, wherein the peripheral device includes a memory mapped data transmit FIFO (First In, First Out) and a memory mapped data receive FIFO;
 wherein the peripheral device is configured to output data from the memory mapped data receive FIFO to the memory bus in response to receiving on the memory bus memory control signals indicating a memory read command and address signals indicating an address mapped to the memory mapped data receive FIFO;
 wherein the peripheral device is configured to write data from the memory bus to the memory mapped data transmit FIFO in response to receiving on the memory bus memory control signals indicating a memory read command and address signals indicating an address mapped to the memory mapped data transmit FIFO.

48. The computer system of claim 44, wherein the peripheral device is configured to support an SDRAM (Synchronous Dynamic Random Access Memory) protocol.

49. A computer system, comprising:
 a memory controller;
 a memory bus coupled to the memory controller;
 memory coupled to the memory bus;
 a peripheral device coupled to the memory bus;
 wherein the peripheral device is configured to respond to memory control signals and address signals generated by the memory controller on the memory bus, and wherein the peripheral device is operable to access a memory mapped control and configuration register included in the peripheral device in response to an address corresponding to the memory mapped control and configuration register being indicated by address signals on the memory bus.

50. The computer system of claim 49, wherein the peripheral device is configured to perform data accesses in response to memory control, address, and data signals dependent on a current setting of the memory mapped control and configuration register.

51. The computer system of claim 49, wherein the peripheral device is operable as a slave device on the memory bus.

52. The computer system of claim 49, wherein the peripheral device is operable as a master device on the memory bus.

53. The computer system of claim 52, wherein the peripheral device is configured to perform scatter/gather bus master operations.

* * * * *